Fig. 1.

Oct. 2, 1973   M. C. SZE ET AL   3,763,263
PRODUCTION OF PROPYLENE
Filed Feb. 16, 1972   3 Sheets-Sheet 2

3,763,263
PRODUCTION OF PROPYLENE
Morgan C. Sze, Upper Montclair, Harvey D. Schindler, Paterson, and Herbert Riegel, Maplewood, N.J., assignors to The Lummus Company, Bloomfield, N.J.
Filed Feb. 16, 1972, Ser. No. 226,865
Int. Cl. C07c 5/18, 11/12
U.S. Cl. 260—683.3 R          27 Claims

ABSTRACT OF THE DISCLOSURE

Propane, hydrogen chloride and a molten mixture of copper chlorides and copper oxychloride are passed cocurrently through a propylene production reactor, with propyl chloride being introduced at an intermediate portion of the reactor. A reaction effluent is recovered, including propylene, hydrogen chloride, propyl chloride and unreacted propane, with the hydrogen chloride, propyl chloride, and unreacted propane being recycled to the propylene production reactor. Melt from the propylene production reactor is oxidized and recycled to the propylene production reactor. The quantities of cupric chloride and copper oxychloride are controlled to provide high propylene selectivity.

---

This invention relates to the production of propylene and more particularly to a continuous process for the production of propylene from propane.

Most commercial processes for producing propylene employ thermal or catalytic cracking, but such processes produce numerous products other than propylene. Consequently, there is a commercial need for a process which produces propylene as its primary or exclusive product.

An object of this invention is to provide an improved process for the production of propylene.

Another object of this invention is to provide an improved process for producing propylene from propane.

These and other objects of the invention should be more readily apparent from reading the following detailed description thereof with reference to the accompanying drawings wherein:

The objects of this invention are broadly accomplished by producing propylene from propane by the use of a molten salt of copper chlorides. More particularly, a gaseous feed of propane is cocurrently contacted with a melt containing cuprous chloride and a controlled quantity of cupric chloride, and optionally also copper oxychloride, with the gaseous feed further including hydrogen chloride when the melt includes copper oxychloride. The processing conditions are regulated in a manner such that the melt withdrawn from the contacting with propane is essentially free of copper oxychloride and includes a controlled quantity of cupric chloride. It has been found that high propylene selectivity can be achieved by employing controlled quantities of cupric chloride and by providing for essentially complete reaction of copper oxychloride, if any, present in the melt.

Still more particularly, a molten mixture of cuprous and cupric chloride is contacted in a first reaction zone with either molecular oxygen or molecular oxygen and hydrogen chloride to produce a molten salt mixture with a controlled amount of copper oxychloride, which can range from about 0% up to the copper oxychloride solubility in the melt, generally up to about 5.5%, by weight, and a controlled quantity of cupric chloride. The molten salt from the first reaction zone is passed to a second reaction zone and cocurrently contacted therein with propane, and, if required, hydrogen chloride. The hydrogen chloride is employed when the melt from the first reaction zone includes copper oxychloride, and is employed in an amount at least sufficient to react with essentially all of the copper oxychloride present in the melt introduced into the second reaction zone, whereby the melt withdrawn from the second reaction zone is essentially free of copper oxychloride. The conditions are also regulated to provide a controlled content of cupric chloride in the melt. The melt and gas from the second reaction zone is introduced into a third reaction zone (the third reaction zone is preferably in the same reactor as the second reaction zone) and cocurrently contacted therein with propyl chloride; i.e., n-propyl chloride and/or i-propyl chloride, to produce a gaseous effluent primarily containing propylene, propyl chloride, other chlorinated products (allyl chloride, polychlorinated propanes), hydrogen chloride and unreacted propane. The molten salt from the third reaction zone is recycled to the first reaction zone, and the gaseous effluent is passed to a separation and recovery zone to recover hydrogen chloride, propane, propylene, propyl chloride and the other chlorinated products therefrom. The hydrogen chloride is recycled to the first reaction zone, and if hydrogen chloride is required in the second reaction zone, all or a portion of the recovered hydrogen chloride is recycled to the second reaction zone. The unreacted propane and propyl chloride are recycled to the second and third reaction zones, respectively. The propylene is recovered as the reaction product.

The molten mixture of copper chlorides also generally includes a metal salt melting point depressant which is nonvolatile and resistant to oxygen at the process conditions, such as a chloride of a univalent metal; i.e., a metal having only one positive valence state, to provide a molten salt mixture having a reduced melting point. The univalent metal chlorides, are preferably alkali metal chlorides, such as potassium and lithium chloride in particular, but it is to be understood that other metal chlorides and mixtures thereof, such as the heavy metal chlorides (heavier than copper) of Groups I, II, III and IV of the Periodic Table; e.g., zinc, silver, and thallium chloride, may also be employed. The metal chloride melting point depressant is added in an amount sufficient to maintain the salt mixture as a melt at the reaction temperatures and is generally added in an amount sufficient to adjust the melting point of the molten salt mixture to a temperature of below about 500° F. In the case of a salt mixture of copper chloride and potassium chloride, the composition of the melt ranges from about 20% to about 40%, preferably about 30%, by weight, potassium chloride, with the remainder being copper chlorides. It is to be understood, however, that in some cases the melt may have a melting point higher than 500° F., provided the catalyst remains in the form of the melt throughout the processing steps. It is further to be understood that the melt may contain other reaction promoters. It is also to be understood that in some cases, the metal chloride may be maintained as a melt without the addition of a melting point depressant.

The propylene is produced from propane by chlorination and dehydrochlorination, with the chlorination being primarily effected in the hereinabove described second reaction zone, although some dehydrochlorination is also effected, and the dehydrochlorination reaction being effected in the hereinabove described third reaction zone.

The various reactions which are effected are believed to be represented by the following equations:

(1)  $C_3H_8 + Cl_2 \rightarrow C_3H_7Cl + HCl$
(2)  $C_3H_7Cl \rightarrow C_3H_6 + HCl$
(3)  $2CuCl_2 \rightarrow Cl_2 + 2CuCl$
(4)  $CuO \cdot CuCl_2 + 2HCl \rightarrow 2CuCl + H_2O$
(5)  $2CuCl + 1/2 O_2 \rightarrow CuO \cdot CuCl_2$ The overall reaction is represented by the following equation (6)  $C_3H_8 + 1/2 O_2 \rightarrow C_3H_6 + H_2O$ It should be apparent from the above equations that in the case where none of the oxygen requirements of the process are met by introduction of copper oxychloride into the second reaction zone, there is a net depletion of cupric chloride (Equation 3) and, accordingly, in order to operate the process continuously, there must be provided means for producing cupric chloride. In the case where copper oxychloride is introduced into the second reaction zone to provide all of the oxygen requirements of the process, in order to operate the process continuously, there must be provided means for producing copper oxychloride. In the case where only a portion of the oxygen requirements of the process are met by the copper oxychloride introduced into the second reaction zone, there must be means for generating both additional copper oxychloride and cupric chloride. It should also be apparent that the overall reactions effected in the second and third reaction zones results in a gaseous reaction effluent which includes, in addition to unconverted propane, propylene, propyl chloride and hydrogen chloride.

The process is preferably effected with two reactors, with the hereinabove described second and third reaction zones being positioned in a single reactor, hereinafter sometimes referred to as a propylene production reactor, with the melt, propane and hydrogen chloride, if any, being introduced at the inlet end of the propylene production reactor and propyl chloride being introduced at an intermediate portion of the reactor, with the point at which propyl chloride is introduced into the propylene production reactor defining the transition from the second to the third reaction zone.

The conditions employed in the second and third reaction zones have been found to have a significant effect on the conversion and overall propylene selectivity of the process. The molten salt introduced into the second reaction zone should have a cupric chloride content from about 10 parts to about 45 parts of cupric chloride, preferably from about 20 parts to about 45 parts, based on 100 parts of the moltent salt, all by weight, and the molten salt withdrawn from the third reaction zone, i.e., at the outlet of the propylene production reactor, should have essentially no chlorinating ability; i.e., the cupric chloride content of the salt mixture at the prevailing pressure is not capable of effecting further chlorination. At atmospheric pressure, a salt mixture having from about 10 to about 20 parts of cupric chloride, based on 100 parts of the molten salt, all by weight, has essentially no chlorinating ability. It is to be understood, however, that at other pressures and conditions other amounts of $CuCl_2$ than hereinabove specified could be present without the molten mixture being considered as having a chlorinating ability. In addition, if the melt introduced into the second reaction zone includes copper oxychloride (the oxychloride is preferably present in an amount from about 0.5% to about 4%, by weight) hydrogen chloride must also be introduced into the second reaction zone in an amount which is at least sufficient to react with essentially all of the copper oxychloride, whereby the melt introduced into the third reaction zone is essentially free of copper oxychloride. The cupric chloride content of the melt remains substantially constant in passage through the third reaction zone and, accordingly, the cupric chloride content of the molten mixture introduced into and withdrawn from the third reaction zone is essentially identical; i.e., the cupric chloride content of the melt withdrawn from the outlet of the propylene production reactor (outlet of third reaction zone) is essentially identical to the cupric chloride content of the melt introduced at the inlet to the third reaction zone.

The second reaction zone, as hereinabove noted, functions primarily as a chlorination zone and, consequently, the chlorinating ability of the melt affects the conversion. The cupric chloride content of the melt over the length of the propylene production reactor should decrease from about 0 part to about 25 parts, by weight, with the decrease of about 0 part being employed when the overall oxygen requirements for the process are provided essentially only by copper oxychloride in the melt introduced into the second zone. As a practical matter, however, there is always some decrease in the cupric chloride content of the melt as the result of the production of chlorinated hydrocarbons other than propyl chlorides, with the chlorine values from such other chlorinated hydrocarbons being recovered as hereinafter described.

In the case where essentially none of the oxygen requirements of the process are provided by copper oxychloride in the melt introduced into the second reaction zone, the cupric chloride content should decrease from about 5 parts to about 25 parts, by weight. In the case where a portion of the oxygen requirements of the process are provided by copper oxychloride in the melt introduced into the second reaction zone, the decrease in cupric chloride content is greater than 0 and less than 25 parts, by weight, with the particular value being determined by the amount of copper oxychloride introduced with the melt into the second reaction zone, the salt flow rate and the amount of cupric chloride introduced with the melt into the second reaction zone. It is to be understood, however, that in all cases, the melt withdrawn from the propylene production reactor, as hereinabove described, has essentially no chlorinating ability (at atmospheric pressure the melt contains from about 10 parts to about 20 parts, by weight, of cupric chloride), and if copper oxychloride is introduced into the propylene production reactor, hydrogen chloride is also introduced in an amount at least sufficient to react with essentially all of the copper oxychloride, whereby the melt introduced into the third reaction zone is essentially free of copper oxychloride; i.e., the amount of copper oxide present in the melt is less than 0.1%, and preferably less than 0.05%, all by weight. The molten salt flow rate through the propylene production reactor (through the second and third zones) is selected to provide a salt to propane flow ratio, by weight, of from about 10:1 to about 750:1, preferably from about 40:1 to about 400:1.

The use of controlled quantities of melt components, in combination with the temperatures prevailing in the propylene production reactor, provide a per pass and overall propylene selectivity of at least about 75%, and per pass propane conversion of from about 15% to about 90%. It is to be understood that the higher conversions are achieved by the presence of copper oxychloride in the melt introduced into the second reaction zone and/or a higher salt flow rate.

Although applicants do not intend to limit their invention by any theoretical reasoning, it is believed that the high propylene selectivity is achieved by insuring that the melt introduced into the third reaction zone is essentially free of copper oxychloride and that the cupric chloride content of the melt withdrawn from the third reaction zone is as hereinabove described.

The use of copper oxychloride in the melt introduced into the propylene production reactor, along with hydrogen chloride, is preferred in that higher conversions are achieved as a result of the increased chlorinating ability of the melt. Of course, the use of copper oxychloride produces water in the effluent which requires a more costly separation, but such increased costs can be compensated for by the increased conversion.

The propylene production reactor is operated at temperatures from about 700° F. to about 950° F., preferably from about 800° F. to about 900° F. at pressures from about 1 atm. to about 20 atm., preferably from about 1 to about 10 atm. The overall reaction in the propylene production is endothermic and, therefore, the temperature of the molten salt decreases from inlet to outlet, with the overall temperature decrease generally ranging from about 25° F. to about 150° F. The major portion of the temperature decrease occurs in the portion of the reactor subsequent to the introduction of propyl chloride, (the third reaction zone) with the temperature decrease in the portion of the reactor prior to introduction of the propyl chloride generally ranging from about 10° F. to about 50° F. Accordingly, the molten salt mixture is at its highest temperature and highest cupric chloride level at the inlet to the second reactor.

The gaseous effluent withdrawn from the propylene production reactor, primarily containing propylene, propyl chloride, other chlorinated products, including allyl chloride and dichloropropanes, hydrogen chloride and unreacted propane (the gaseous effluent may also include ethylene, ethane, methane and water vapor) is passed to a separation and recovery zone to recover the various components. The recovered propane and propyl chloride are returned to the second and third reaction zones, respectively. The recovered hydrogen chloride is returned to the second reaction zone to provide the hydrogen chloride requirements, if any, therefor, and the remainder of the hydrogen chloride, if any, is pasesd to the first reaction zone (sometimes hereinafter referred to as an oxidizer).

The first reaction zone is employed to provide the molten salt which is to be introduced into the propylene production reactor (second reaction zone) with the required chlorinating ability, as represented by cupric chloride and/or copper oxychloride. If only a portion of the oxygen requirements of the process have been provided by the copper oxychloride introduced into the propylene production reactor, there is a net depletion of cupric chloride in the propylene production reactor and, accordingly, the first reaction zone is employed to regenerate such cupric chloride by contacting the melt with gaseous hydrogen chloride and molecular oxygen to convert cuprous chloride to cupric chloride, as represented by the following equation:

(7)     $2CuCl + 2HCl + 1/2 O_2 \rightarrow 2CuCl_2 + H_2O$

If all of the oxygen requirements of the process are provided by the copper oxychloride introduced into the propylene production reactor, there is essentially no net depletion of cupric chloride, and the first reaction zone is employed to produce copper oxychloride by contacting the melt with molecular oxygen, as represented by hereinabove Equation 5:

(5)     $2CuCl + 1/2 O_2 \rightarrow CuO \cdot CuCl_2$

In the case where a portion of the oxygen requirements of the process are provided by the copper oxychloride introduced into the propylene production reactor, the molten salt is contacted with hydrogen chloride and oxygen to both increase the cupric chloride content of the salt (Equation 7) and to provide a net production of copper oxychloride (Equation 5).

The processing conditions for the first reaction zone are fixed, in part, by the reaction requirements for the propylene production reactor. Thus, the salt flow rate in the propylene production reactor fixes the salt flow rate in the first reaction zone. Similarly, the quantity of cupric chloride introduced into the first reaction zone and the quantity of cupric chloride and copper oxychloride withdrawn from the first reaction zone are also fixed by the requirements of the propylene production reaction; i.e., the cupric chloride content of the melt introduced into the first reaction zone is set by the cupric chloride outlet requirements of the propylene production reactor, and the copper oxychloride and cupric chloride content of the melt withdrawn from the first reaction zone is fixed by the inlet requirements for such components in the propylene production reactor.

The first reaction zone is operated at temperatures from about 700° F. to about 950° F., and pressures from about 1 atm. to about 20 atm., preferably from about 1 to about 10 atm. The salt oxidation is exothermic and, therefore, the temperature of the molten salt increases from inlet to outlet, with the overall temperature increase being determined by the salt flow rate; the temperature increase generally ranging from about 25° F. to about 150° F. Thus, the molten salt mixture is at its lowest temperature and lowest cupric chloride level at the inlet to the first reaction zone.

It is to be understood that, in some cases, propyl chloride could be recovered and dehydrochlorinated to propylene by a conventional dehydrochlorination procedure, in which case, there is no third reaction zone in the propylene production reactor, i.e., recycle propyl chloride is not introduced into an intermediate portion of the propylene production reactor. In such an embodiment, the inlet and outlet cupric chloride and copper oxychloride concentrations of the melt are regulated as hereinabove described; i.e., inlet cupric chloride is from about 10 to about 45 parts, by weight; inlet copper oxychloride of from about 0% to about 5.5%, by weight; hydrogen chloride in an amount at least sufficient to react with essentially all of the copper oxychloride; outlet cupric chloride concentration at the prevailing pressure having essentially no chlorinating ability (at atmospheric pressure about 10 to 20 parts, by weight, cupric chloride), with essentially no copper oxychloride. The hydrogen produced in the dehydrochlorination of propyl chloride may be recycled to the propylene production reactor and/or the oxidizer.

Alternatively, the propyl chloride produced in the propylene production reactor may be recovered as reaction product.

Accordingly, in accordance with the present invention propylene may be produced from propane with or without production of propyl chloride as a co-reaction product, and if propyl chloride is to be ultimately converted to propylene, dehydrochlorination of such propyl chloride may be effected by any of the procedures known in the art or by contacting propyl chloride with a molten mixture of copper chlorides, as hereinabove described, with the propyl chloride preferably being dehydrochlorinated in the presence of a molten mixture of copper chlorides.

As a distinct feature of the overall process of the invention, chlorinated products other than propyl chloride produced in the propylene production reactor are burned to recover the chlorine values therefrom, and such chlorine values are employed to chlorinate the molten salt in the first reactor. More particularly, the other chlorinated products are burned in the presence of free oxygen; e.g., air, at a temperature from about 1000° F. to about 3000° F. and at pressures from about 1 atm. to about 20 atm., with the oxygen being provided in an amount to provide at least about the stoichiometric reaction requirements, with the combustion reaction using dichloropropane as a representative example, being represented by the following equations:

(8)     $C_3H_6Cl_2 + 9/2 O_2 \rightarrow 3CO_2 + 3H_2O + Cl_2$ (9)     $C_3H_6Cl_2 + 4O_2 \rightarrow 3CO_2 + 2H_2O + 2HCl$ The amount of oxygen employed for the combustion may exceed stoichiometric requirements, but in such a case, the excess oxygen must be considered in determining the oxygen requirements for the salt oxidation. The combustion effluent is introduced into the first reaction zone and the chlorine and/or hydrogen chloride are separated therefrom by chlorinating cuprous chloride to cupric chloride.

Thus, the depletion of cupric chloride in the propylene production reactor resulting from the production of chlorinated hydrocarbons other than propyl chloride is compensated for in the first reaction zone by producing cupric chloride from the chlorine values recovered from the other chlorinated hydrocarbons.

Thus, in accordance with the overall process of the invention, propane is effectively converted to propylene by recovery of essentially all chlorine values within the process, with the overall reaction being represented by the following equation:

(6)  $C_3H_8 + 1/2 O_2 \rightarrow C_3H_6 + H_2O$

In addition, the overall process is effected with high propylene selectively, thereby reducing the necessity to recycle other by-products.

In accordance with the preferred embodiment of the invention, essentially all of the oxygen requirements of the process are provided by the copper oxychloride in the melt introduced into the propylene production reactor and, accordingly, the hydrogen chloride recovered from the effluent from the propylene production reactor is essentially completely recycled thereto to react with the copper oxychloride. A schematic flow diagram of such a preferred embodiment is illustrated in the drawings and the preferred embodiment is further described with respect to such drawings. It is to be understood that the molten chloride salts are highly corrosive and, accordingly, the processing equipment must be suitably protected, e.g., the reactors may be lined with ceramic. Similarly, if pumps are used for transporting the molten salts they must also be protected. The molten salts, however, are preferably transferred between the reactors by the use of gas lifts, as known in the art.

Figure 1:
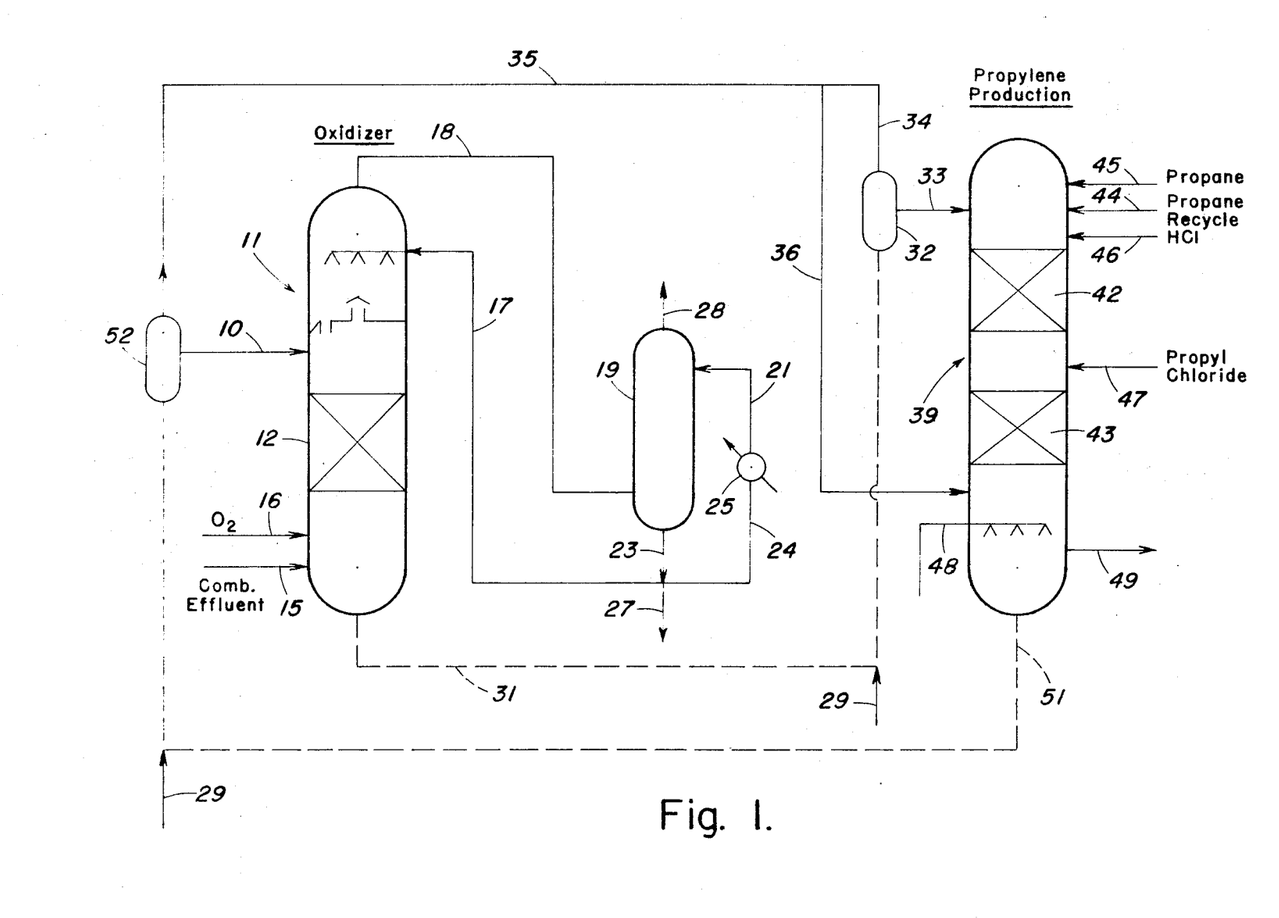
FIG. 1 is a simplified schematic flow diagram of the reactor section of a preferred embodiment of the invention.

Referring now to FIG. 1, a molten salt mixture of cuprous and cupric chloride, and preferably also potassium chloride which functions as a melting point depressant, in line 10, is introduced into the top of an oxidation reactor 11, including a packed section 12 to promote intimate contact between the molten salt and a gaseous stream containing oxygen and chlorine values, in the form of hydrogen chloride and generally also chlorine. It is to be understood that more than one packed sections may be employed. A gaseous stream in line 15 containing chlorine values in the form of chlorine and/or hydrogen chloride, and generally also including water vapor, carbon dioxide and nitrogen, recovered from chlorinated by-products, as hereinafter described, is introduced into chlorination reactor 11 below packing 12 to countercurrently contact the descending molten salt. A molecular oxygen-containing stream in line 16, such as air, is introduced into oxidation reactor 11 below packing 12 to also countercurrently contact the descending molten salt.

The processing conditions in oxidation reactor 11 are as hereinabove described with the reactor being maintained at a temperature from about 725° F. to about 900° F. at a pressure from about 1 atm. to about 10 atm., with the flow rate of the salt being determined by the processing requirements of the propylene production reactor. The free oxygen-containing gas in line 16 is introduced in an amount to both meet the stoichiometric requirements for recovery of the hydrogen chloride introduced with the combustion effluent in line 15, and to provide the amount of copper oxychloride required for the propylene production reactor. As a result of the intimate contact between the molten salt, the molecular oxygen and the combustion effluent, including hydrogen chloride and some chlorine, hydrogen chloride and chlorine are recovered from the combustion effluent by enriching the salt in cupric chloride, with the temperature and cupric chloride content of the molten salt being increased as the molten salt descends in reactor 11. In addition, as a result of the intimate contact between the molecular oxygen and the molten salt, the salt is enriched in copper oxychloride.

The gas stream withdrawn from the top of packed section 12 in reactor 11 containing carbon oxides (carbon dioxide and/or carbon monoxide), nitrogen, water vapor and perhaps some hydrogen chloride and/or chlorine, is cooled by direct contact with a spray of quench liquid introduced through line 17, preferably recycle dilute hydrochloric acid obtained as hereinafter described. As a result of the direct contact with the quench liquid the gaseous stream is cooled to a temperature from about 400° F. to about 500° F., with such cooling functioning to condense and separate any entrained molten salt.

The cooled gaseous stream, now free of any entrained molten salt and containing vaporized quench liquid, withdrawn from reactor 11 through line 18 is introduced into a quench tower 19, of a type known in the art. In quench tower 19, the gaseous stream is contacted with a suitable quench liquid, such as an aqueous solution of hydrogen chloride, introduced through line 21 to effect cooling of the gaseous stream to a temperature at which essentially all of the hydrogen chloride and water vapor is condensed from the gaseous stream. The condensed aqueous hydrogen chloride is withdrawn from tower 19 through line 23 and a first portion thereof is passed through line 17 as the quench liquid for reactor 11, a second portion thereof is passed through line 24, including a cooler 25, for introduction into the quench tower 19 through line 21 and a third portion; i.e., the portion not required for meeting the quenching requirements of the process, i.e., the net make of water in reactor 11, is withdrawn through line 27. The water withdrawn through line 27 may be passed to a hydrogen chloride recovery zone, hereinafter described, if warranted, to recover hydrogen chloride therefrom. Alternatively, the quench tower 19 could be operated to condense from the gas introduced therein through line 18 the quenching requirements for reactor 11 and quench tower 19, with the remainder of the water vapor being withdrawn with the gaseous stream withdrawn from the quench tower through line 28. As a further alternative, the net water make in line 27 could be treated with alkali to neutralize any hydrogen chloride prior to being discarded.

The gaseous stream withdrawn from tower 19 through line 28, if required, may be subjected to alkali scrubbing prior to release to the atmosphere.

The molten salt withdrawn from reactor 11 in line 31, now containing copper oxychloride, is passed by lift gas in line 29 to a gas-liquid separator 32 wherein the molten salt is separated from the lift gas. The separated molten salt is introduced into propylene production reactor 39 through line 33. The separated lift gas, in line 34, is combined with lift gas in line 35, obtained as hereinafter described, and passed through line 36 for quenching to thereby separate entrained molten salt therefrom.

The reactor 39 contains packed sections 42 and 43, and the molten salt is introduced above packed section 42 along with gaseous recycle propane in line 44 and gaseous feed propane in line 45 and recycle hydrogen chloride in line 46. Gaseous recycle propyl chloride is introduced into reactor 39 through line 47 between packed sections 42 and 43. The molten chloride salt descends through packed sections 42 and 43 of reactor 39 in intimate co-current contact with the gaseous streams, resulting primarily in the production of propylene, hydrogen chloride, propyl chloride, other chlorinated products, water vapor and small quantities of ethane, ethylene and methane.

The processing conditions in reactor 39 are as hereinabove described with the reactor 39 being operated at a temperature from about 725° F. to about 900° F. and a pressure from about 1 atm. to about 10 atm. The amount of copper oxychloride present in the melt introduced through line 33 is coordinated with the amount of recycle hydrogen chloride introduced through line 46, and the reaction conditions in reactor 39; i.e., temperature, pressure, salt flow rate and residence time, to ensure that the molten salt withdrawn from packing 42 for contact with the propyl chloride is essentially free of copper oxychloride. Similarly, the amount of cupric chloride present in the melt introduced through line 33 is coordinated with the reaction conditions in reactor 39 to insure that the melt withdrawn from reactor 39 has essentially no chlorinating ability. The conditions employed in reactor 39, as hereinabove described, provide high propane conversion in conjunction with high propylene selectivity.

The gaseous effluent withdrawn from the bottom of packed section 43, including propylene, propane, propyl chloride, hydrogen chloride, water vapor and other chlorinated products including dichloropropanes and possibly some light hydrocarbons, is combined with the lift gas in line 36 and cooled by direct contact with a spray of a quench liquid, preferably dichloropropanes, introduced through line 48. As a result of such contact, the gaseous stream is cooled to a temperature from about 450° F. to about 500° F. thereby condensing and separating any entrained molten salt. The gaseous effluent, now containing vaporized quench liquid, is withdrawn from reactor 39 through line 49 for further processing as hereinafter described.

The molten salt withdrawn from reactor 39 in line 51, is passed by lift gas in line 29 to a gas-liquid separator 52 wherein the molten salt is separated from the lift gas. The separated molten salt is introduced into reactor 11 through line 10. The separated lift gas, in line 35, is combined with lift gas in line 34, and passed through line 36 for quenching to thereby separate entrained molten salt therefrom.

Figure 2:
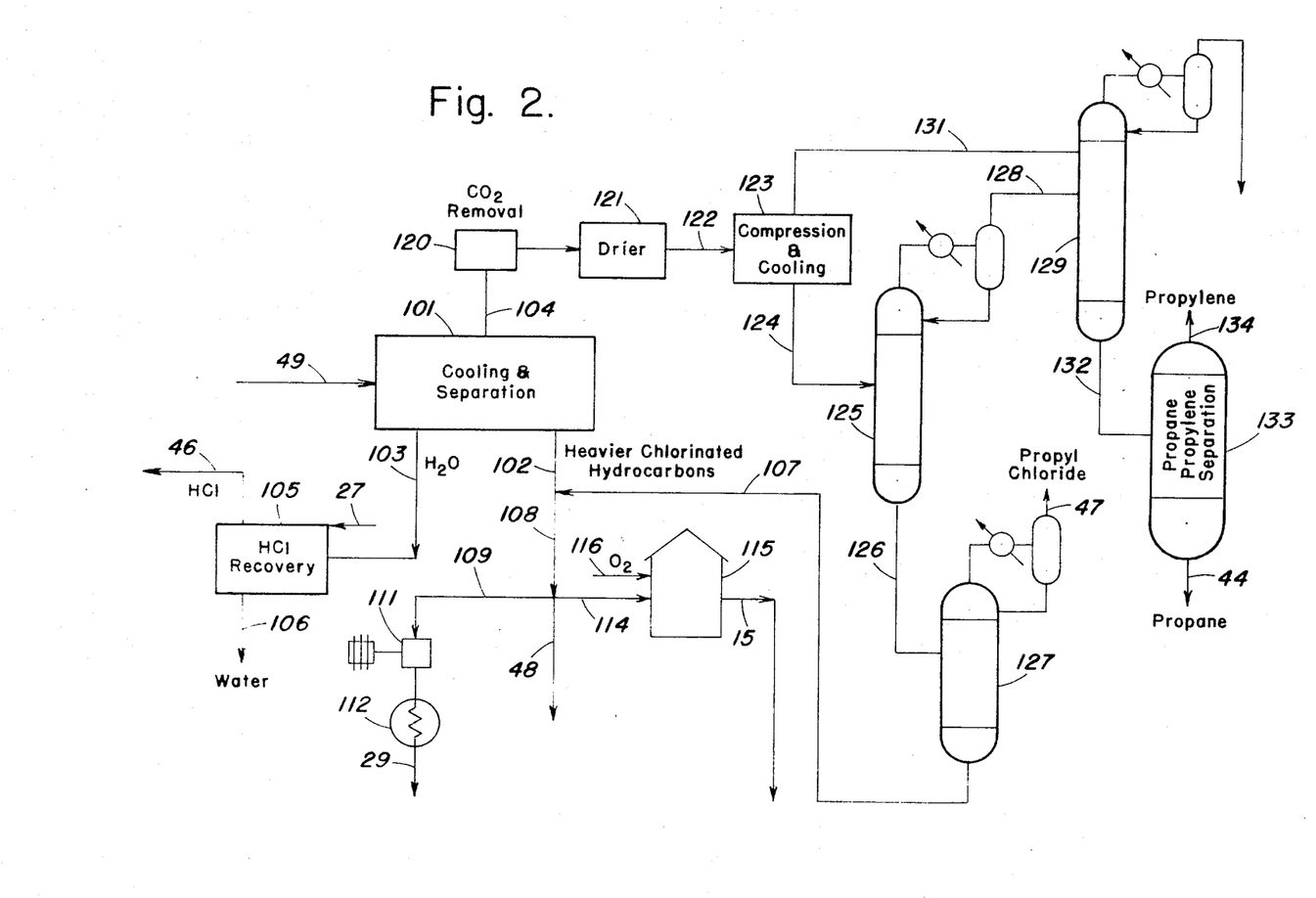
FIG. 2 is a simplified schematic flow diagram of the separation and recovery section of the preferred embodiment of the invention.

Referring now to FIG. 2, the gaseous effluent from reactor 39 in line 49 is passed to a cooling and separation zone, schematically indicated as 101, designed to cool the gaseous effluent to separate essentially all of the water vapor therefrom. The separation and recovery zone 101 as known in the art may include one or more coolers and gas-liquid separators. As a result of the cooling in separation and recovery zone 101, water vapor and chlorinated hydrocarbons, primarily dichloropropanes, are condensed from the effluent, the condensed water containing hydrogen chloride. The condensed chlorinated hydrocarbons are withdrawn from cooling and separation zone 101 through line 102, the condensed water, containing hydrogen chloride is withdrawn through line 103, and the remaining portion of the gaseous effluent is withdrawn through line 104.

The aqueous hydrogen chloride in line 103 is introduced into a hydrogen chloride recovery zone 105 to separate hydrogen chloride from the water. The hydrogen chloride recovery zone 105 may include azeotropic distillation columns, as known in the art, or any other suitable recovery equipment for recovering essentially water-free hydrogen chloride. As hereinabove noted, aqueous hydrogen chloride from quench tower 19 in line 27 may also be introduced into recovery zone 105.

An essentially water-free hydrogen chloride gas is withdrawn from separation and recovery zone 105 through line 46 for recycle to reactor 39, and essentially hydrogen chloride-free water is withdrawn therefrom through line 106 (the water in line 106, if required, is neutralized with alkali).

The heavier chlorinated hydrocarbons, primarily dichloropropanes, in line 102 are combined with heavier chlorinated hydrocarbons in line 107, obtained as hereinafter described, and the combined stream in line 108 is divided into three portions. A first portion is passed through line 109, pumped in pump 111, the temperature thereof regulated in heat exchanger 112 and passed through line 29 as lift gas for the melts to be introduced into reactors 11 and 39. The heat exchanger 112 is employed to control the temperature of the lift gas, whereby the lift gas may be used to adjust the temperature of the circulating melt. A second portion of the chlorinated hydrocarbons is passed through line 48 to meet the quenching requirements of reactor 39.

The remaining portion of chlorinated hydrocarbons in line 108, i.e., the portion not required for use as a quench or lift gas, is passed through line 114, and introduced into furnace 115 along with a molecular oxygen-containing gas in line 116 to burn the chlorinated hydrocarbons and thereby recover the chlorine values therefrom as hydrogen chloride and/or chlorine. A combustion effluent is withdrawn from furnace 115 through line 15 and introduced into reactor 11 to recover the chlorine values therefrom.

The remaining effluent gases from zone 101 in line 104 are passed through a carbon dioxide removal zone, of a type known in the art, schematically indicated as 120 and through a drier 121 to remove any remaining water. The dried gas in line 122 is introduced into a compression and cooling section schematically indicated as 123. The compression and cooling section 123, as known in the art, includes a plurality of compressors and separators, the section 123 being designed and operated to provide a gaseous stream essentially free of components heavier than propane.

A liquid stream, which includes all components heavier than propane, in addition to propane, and perhaps some lighter components, from zone 123, in line 124, is introduced into a depropanizer tower 125 operated at temperatures and pressures to provide, as overhead, propane and lighter components. The bottoms withdrawn from tower 125 through line 126, contains propyl chlorides, some propane and heavier chlorinated hydrocarbons, primarily dichloropropanes and the bottoms in line 126 is introduced into a stripping column 127 to strip propyl chloride and lighter components therefrom.

The heavier chlorinated hydrocarbons bottoms, primarily dichloropropanes, is withdrawn from tower 127 through line 107 and passed to line 102. The overhead from column 127, comprising propyl chloride, and generally also some propane, is withdrawn therefrom through line 47 for introduction into reactor 39 as hereinabove described.

The net overhead from tower 125 in line 128 is introduced into de-ethanizer 129 along with the gaseous stream from section 123 in line 131. The fractional distillation tower 129 is operated at temperatures and pressures to produce a bottoms heavier than ethane.

The bottoms from tower 129 containing propane and propylene, is withdrawn through line 132 and introduced into a propane-propylene splitter schematically indicated as 133, of a type known in the art, to produce a propylene overhead and a propane bottoms. Although the splitter is shown as a single tower, it is to be understood that two towers, as known in the art, may be employed. The net propylene overhead in line 134 is recovered as product, and the propane bottoms is passed to the reactor 39 through line 44.

The net overhead from de-ethanizer 129 is primarily comprised of ethane, ethylene and methane. The separation and recovery of these components forms no part of the present invention and, accordingly, no detailed explanation of such recovery is deemed necessary for a full understanding of the present invention.

Numerous modifications and variations of the hereinabove described embodiment are possible within the scope of the present invention. Thus, for example, as hereinabove described, recovered hydrogen chloride could be recycled to reactor 11 as well as to reactor 39, in which case, less copper oxychloride is introduced with the melt introduced into reactor 39 and there is a greater decrease in the cupric chloride content of the melt in reactor 39.

As another alternative, as hereinabove described, all of the hydrogen chloride could be recycled to reactor 11, in which case, essentially no copper oxychloride is present in the melt introduced into reactor 39. In such an embodiment, the reaction effluent from reactor 39 contains little, if any, water vapor thereby simplifying the separation and recovery of the various components therefrom. This embodiment, however, results in lower rates of conversion. It is also to be understood that the effluent from reactor 11 in such an embodiment would contain greater quantities of hydrogen chloride, thereby necessitating recovery of hydrogen chloride from the effluent to provide an economic process.

As still a further alternative, three different reactors may be employed, instead of including the second and third reaction zones in a single reactor. Similarly, a single reactor divided into three zones may also be employed.

As still another modification, the propyl chloride produced in the propylene production reactor, instead of being recycled to an intermediate portion thereof, may be dehydrochlorinated to propylene in a conventional propyl chloride dehydrochlorination reaction. In such as modification, the hydrogen chloride recovered from the dehydrochlorination is preferably recycled to the propylene production reactor.

As still a further modification, the propyl chloride may be recovered as a co-reaction product.

Figure 3:
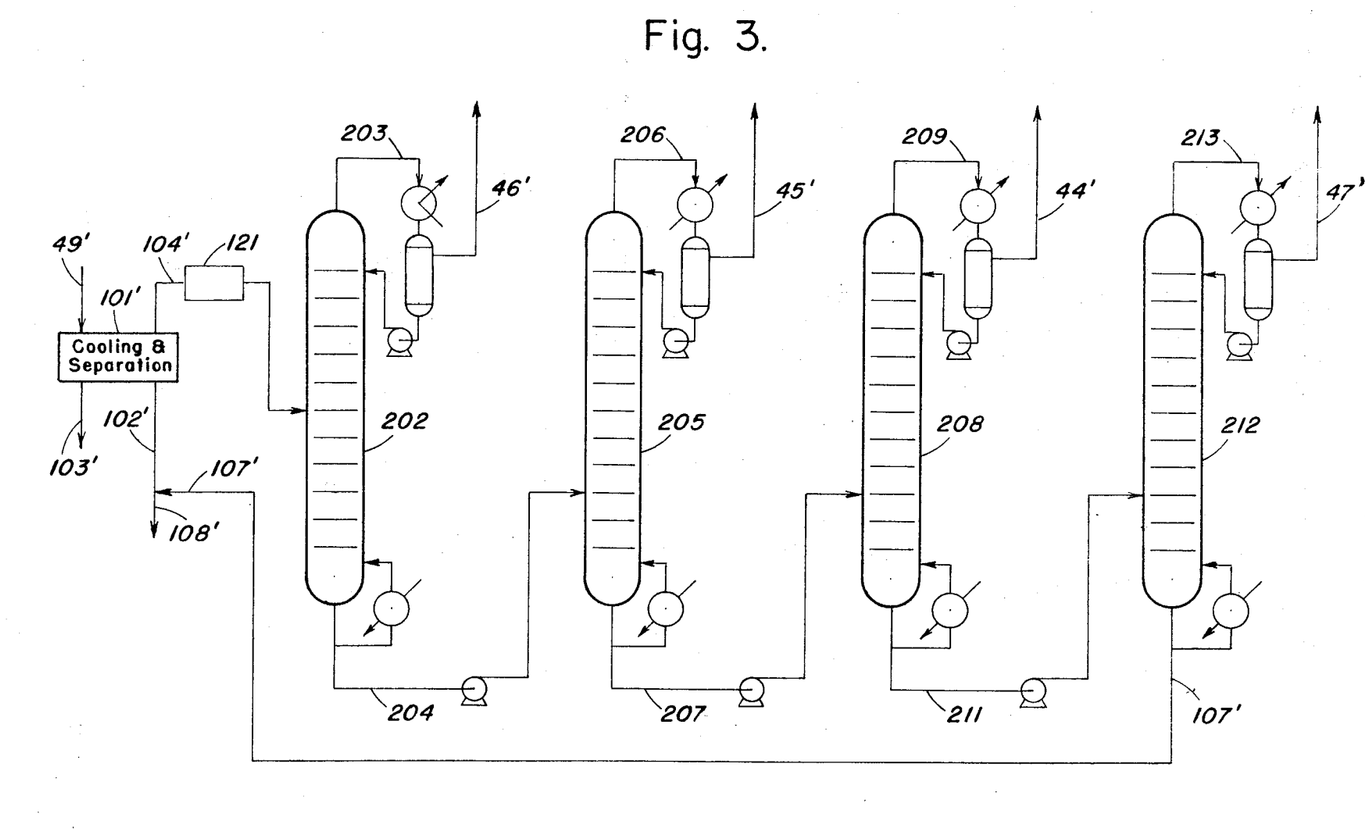
FIG. 3 is a simplified schematic flow diagram of an alternative recovery scheme.

As yet another modification, the separation and recovery of various components may be effected in a manner other than as particularly described. Such an alternative, although less preferred, is illustrated in FIG. 3. In FIG. 3, like parts are designated by like prime numerals.

Referring now to FIG. 3, the gaseous stream withdrawn from drier 121' is compressed and introduced into a fractional distillation column 202, provided with suitable reflux and reboil sections. The column 202 is designed and operated to recover hydrogen chloride as overhead, with any light by-products, such as methane, ethane or ethylene produced in reactor 39 being recovered with the hydrogen chloride overhead. The hydrogen chloride overhead withdrawn from column 202 through line 203 is passed through the reflux condenser and accumulator thereof and the recovered overhead passed through line 46 for introduction into reactor 39. In the event of significant ethylene and/or ethane and/or methane production, the overhead from column 202 may be processed to recover such ethylene and/or ethane and/or methane prior to recycle of the hydrogen chloride.

The bottoms withdrawn from column 202 through line 204, containing propyl chloride, propane, propylene and other chlorinated by products, such as dichloropropanes and allyl chloride, is introduced into fractional distillation column 205, provided with suitable reflux and reboil sections. The column 205 is designed and operated to recover propylene as overhead, through line 206, with the propylene being passed to further purification and/or storage as net product.

The bottoms withdrawn from column 205 through line 207, containing propyl chloride, propane and other chlorinated products, is introduced into fractional distillation column 208, provided with suitable reflux and reboil sections. The column 208 is designed and operated to recover propane as overhead through line 209, with the recovered propane overhead being recycled to reactor 39 through line 44'.

The bottoms withdrawn from column 208 through line 211, containing propyl chloride and heavier chlorinated products and generally also some propane, is introduced into fractional distillation column 212, provided with suitable reflux and reboil sections. The column 212 is designed and operated to recover propyl chloride as overhead through line 213, which may include some chloropropylenes, in particular, allyl chloride, which is recycled to reactor 39 through line 47'.

The bottoms withdrawn from column 212 through line 107', containing polychlorinated propanes primarily dichloropropanes is passed to line 102.

It should be readily apparent that in the event that there is a separate market or need for any reaction intermediates, such intermediates instead of being recycled or burned may be separately recovered.

The invention will be further described with respect to the following example but it is to be understood that the scope thereof is not to be limited thereby:

EXAMPLE

The following example is illustrative of an embodiment in which essentially all of the oxygen requirements are provided by circulating oxychloride to the propylene production reactor.

SALT CIRCULATION (LBS./HR.)

|  | Line 10 | Line 31 |
|---|---|---|
| $KCl$ | 4,250,000 | 4,250,000 |
| $CuCl$ | 7,810,000 | 7,546,000 |
| $CuCl_2$ | 2,120,000 | 2,120,000 |
| $Cu_2OCl_2$ |  | 142,000 |
| Degrees F | 750 | 875 |

PROCESS STREAMS

| Line | 16 | 18 | 28 | 44 | 45 | 46 | 47 | 49 |
|---|---|---|---|---|---|---|---|---|
| Temp., °F | 330 | 450 | 105 | 150 | 80 | 25 | 200 | 450 |
| Pressure, p.s.i.g | 50 | 45 |  | 50 | 50 | 50 | 47 | 45 |
| Component (moles/hr.): | | | | | | | | |
| $HCl$ |  |  | Trace |  |  | 1,200 |  | 1,200 |
| $H_2O$ |  | 16 | 616 | 55 |  |  |  | 587 |
| $N_2$ |  | 1,400 | 1,400 | 1,400 |  |  |  |  |
| $O_2$ |  | 371 | 9 | 9 |  |  |  |  |
| $CO_2$ |  |  |  |  |  |  |  | 38 |
| $CH_4$ |  |  |  |  |  |  |  | 116 |
| $C_2H_4$ |  |  |  |  |  | 1 |  | 90 |
| $C_2H_6$ |  |  |  |  |  | 9 |  | 10 |
| $C_3H_6$ |  |  |  |  | 24 | 6 |  | 605 |
| $C_3H_8$ |  |  |  |  | 500 | 715.3 | 60 | 562 |
| $C_3H_7Cl$ |  |  |  |  | 2 |  | 69 | 71 |
| $C_3H_6Cl_2$ |  |  |  |  |  |  | 2 | 30 |
| Total | 1,787 | 2,025 | 1,464 | 526 | 715.3 | 1,216 | 132 | 3,309 |

The net reactor effluent is introduced into the separation and recovery zone to recover the various recycle streams by-products and propylene product.

The process of the present invention effectively produces propylene from propane and oxygen with the overall economics of the process being quite suitable as a result of the effective recovery of the chlorine values produced in the propylene production reactor as organic chlorides and hydrogen chloride.

The production of propylene from propane in the propylene production reactor is effected with high propylene selectivity, with the selectivity to propylene generally being at least about 75%, and in most cases in the range from about 80% to about 90%, with minimum cracking and carbonization, and minimum production of chlorinated products which cannot be effectively converted to propylene. The per pass conversion of propane generally ranges from about 15% to about 90%.

The controlling of the molten salt flow rates in the propylene production reactor to provide controlled concentrations of copper oxychloride and cupric chloride, as hereinabove described, in conjunction with cocurrent flow are believed to be the processing conditions primarily responsible for the high propylene selectivity, and the minimization of chlorinated products other than propyl chloride.

Numerous modifications and variations of the present invention are possible and, therefore, the invention may be practiced within the scope of the appended claims in a manner other than as particularly described.

What is claimed is:

1. A process for producing propylene from propane, comprising:
   introducing into the inlet end of a reaction zone a gaseous feed comprising propane and a molten mixture of cuprous chloride, cupric chloride and copper oxychloride, said copper oxychloride being present in an amount from about 0% to about 5.5% by weight, said gaseous feed further comprising hydrogen chloride when said molten includes copper oxychloride;

cocurrently contacting said gaseous feed and molten mixture at a temperature from about 700° F. to about 950° F. and at a rate and quantity to provide at the outlet end of the reaction zone a molten mixture which is essentially free of copper oxychloride and which has essentially no chlorinating ability;

withdrawing from the outlet end of the reaction zone a gaseous effluent comprising propylene and propyl chloride;

recovering the propyl chloride from the gaseous effluent; and dehydrochlorinating the propyl chloride to produce propylene.

2. The process of claim 1 wherein at the outlet end of said reaction zone said cupric chloride is present in an amount from about 10% to about 20%, by weight.

3. The process of claim 2 wherein said copper oxychloride is present in an amount from about 0.5% to about 4%, by weight.

4. The process of claim 3 and further comprising recovering hydrogen chloride produced in the dehydrochlorination and introducing at least a portion of said recovered hydrogen chloride into the inlet end of said reaction zone.

5. A process for producing propylene from propane, comprising:
(a) contacting in a first reaction zone a melt comprising cuprous and cupric chloride with a member selected from the group consisting of molecular oxygen and molecular oxygen and hydrogen chloride to produce a melt further comprising from about 0% to about 5.5%, by weight, of copper oxychloride;
(b) cocurrently contacting in a second reaction zone melt from the first reaction zone with a gaseous feed comprising propane, said gaseous feed further comprising hydrogen chloride when said melt includes copper oxychloride, said contacting being effected at a temperature from about 700° F. to about 950° F. and at a rate and quantity to provide at the outlet end of the second reaction zone a molten mixture which is essentially free of copper oxychloride and has essentially no chlorination ability;
(c) withdrawing from the second reaction zone a reaction effluent comprising propane, propylene, hydrogen chloride and propyl chloride;
(d) recovering propane, propylene, hydrogen chloride and propyl chloride from the reaction effluent;
(e) passing melt from the second reaction zone to the first reaction zone;
(f) dehydrochlorinating recovered propyl chloride to propylene and hydrogen chloride; and
(g) employing hydrogen chloride recovered from steps (d) and (f) in at least one of said first and second reaction zones to provide hydrogen chloride therefor.

6. The process of claim 5 wherein at the outlet end of said second reaction zone said cupric chloride is present in an amount from about 10% to about 20%, by weight.

7. The process of claim 6 wherein the melt introduced into the second reaction zone includes copper oxychloride in an amount from about 0.5% to about 4%, by weight, said oxychloride being sufficient to provide the oxygen requirements of the process, said hydrogen chloride in step (g) being passed to the second reaction zone.

8. The process of claim 7 wherein said melt introduced into the second reaction zone contains from about 10% to about 20%, by weight, of cupric chloride.

9. The process of claim 8 wherein said melt further includes a melting point depressant.

10. The process of claim 9 wherein said melting point depressant is potassium chloride.

11. The process of claim 6 wherein said melt introduced into the second reaction zone is essentially free of copper oxychloride and the hydrogen chloride in step (g) is employed in the first reaction zone.

12. The process of claim 6 wherein said melt introduced into the second reaction zone includes copper oxychloride in an amount insufficient to provide the oxygen requirements of the process and hydrogen chloride in step (g) is employed in both the first and second reaction zones.

13. A process for producing propylene, comprising:
cocurrently contacting in a first reaction zone a molten mixture of cuprous chloride, cupric chloride and copper oxychloride, said copper oxychloride being present in an amount from about 0% to about 5%, by weight, with a gaseous feed comprising propane, said gaseous feed further comprising hydrogen chloride when said melt includes copper oxychloride, said contacting being effected at a temperature from about 700° F. to about 950° F. and at a rate and quantity to provide at the outlet end of the first reaction zone a molten mixture which is essentially free of copper oxychloride and which has essentially no chlorinating ability;
cocurrently contacting the melt and gases from the first reaction zone in a second reaction zone with propyl chloride; and
withdrawing from the second reaction zone a reaction effluent comprising propylene.

14. The process of claim 13 wherein the reaction effluent further comprises propyl chloride, hydrogen chloride and propane, said propane being recovered and recycled to the inlet of the first reaction zone and said propyl chloride being recovered and recycled to the second reaction zone.

15. The process of claim 14 wherein hydrogen chloride is recovered from the effluent and is recycled to the inlet and of the first reaction zone.

16. The process of claim 15 wherein said molten mixture further comprises potassium chloride as a melting point depressant.

17. The process of claim 16 wherein at the outlet end of the second reaction zone said cupric chloride is present in an amount from about 10% to about 20% by weight.

18. The process of claim 17 wherein said first and second reaction zones are in a single reactor.

19. A process for producing propylene from propane, comprising:
(a) contacting in a first reaction zone a melt comprising cuprous and cupric chloride with a member selected from the group consisting of molecular oxygen and molecular oxygen and hydrogen chloride to produce a melt further comprising from about 0% to about 5.5%, by weight, of copper oxychloride;
(b) cocurrently contacting in a second reaction zone melt from the first reaction zone with a gaseous feed comprising propane, said gaseous feed further comprising hydrogen chloride when said melt includes copper oxychloride, said contacting being effected at a temperature from about 700° F. to about 950° F. and at a rate and quantity to provide at the outlet end of the second reaction zone a molten mixture which is essentially free of copper oxychloride and which has essentially no chlorinating ability;
(c) cocurrently contacting the melt and gases from the second reaction zone in a third reaction zone with propyl chloride;
(d) withdrawing from the third reaction zone a reaction effluent comprising propane, propylene, hydrogen chloride and propyl chloride;
(e) recovering propane, propylene, hydrogen chloride and propyl chloride from the reaction effluent;
(f) passing melt from the third reaction zone to the first reaction zone;
(g) passing recovered propane to the second reaction zone;
(h) passing recovered propyl chloride to the third reaction zone; and
(i) employing recovered hydrogen chloride in at least one of the first and second reaction zones to provide hydrogen chloride therefor.

20. The process of claim 19 wherein at the outlet end of said second reaction zone said cupric chloride is present in an amount from about 10% to about 20%, by weight.

21. The process of claim 20 wherein the melt introduced into the second reaction zone includes copper oxychloride in an amount from about 0.5% to about 4%, by weight, said oxychloride being sufficient to provide the oxygen requirements of the process, said hydrogen chloride in step (e) being passed to the second reaction zone.

22. The process of claim 21 wherein said melt introduced into the second reaction zone contains from about 10% to about 20%, by weight, of cupric chloride.

23. The process of claim 22 wherein said melt further includes a melting point depressant.

24. The process of claim 23 wherein said melting point depressant is potassium chloride.

25. The process of claim 20 wherein said melt introduced into the second reaction zone is essentially free of copper oxychloride and the hydrogen chloride in step (i) is employed in the first reaction zone.

26. The process of claim 20 wherein said melt introduced into the second reaction zone includes copper oxychloride in an amount insufficient to provide the oxygen requirements of the process and hydrogen chloride in step (i) is employed in both the first and second reaction zones.

27. The process of claim 19 wherein said reaction effluent withdrawn from the third reaction zone further comprises chlorinated propanes in addition to propyl chloride and further comprising burning said chlorinated propanes to produce a combustion effluent comprising hydrogen chloride and chlorine and introducing said combustion effluent into the first reaction zone.

References Cited
UNITED STATES PATENTS

| | | | |
|---|---|---|---|
| 3,637,895 | 1/1972 | Riegel et al. | 260—683.3 |
| 3,449,458 | 6/1969 | Tiedje et al. | 260—669 A |
| 2,407,828 | 9/1946 | Gorin | 260—659 A |
| 2,418,930 | 4/1947 | Gorin | 260—659 A |
| 2,418,931 | 4/1947 | Gorin | 260—659 A |
| 2,498,552 | 2/1950 | Kilgren et al. | 260—659 A |
| 2,838,577 | 6/1958 | Cook et al. | 260—656 |
| 3,080,435 | 3/1963 | Nager | 260—673.5 |
| 3,210,158 | 10/1965 | Engel et al. | 252—441 X |
| 3,214,481 | 10/1965 | Heinemann et al. | 252—441 X |
| 3,332,885 | 7/1967 | Imoto et al. | 252—441 X |

DELBERT E. GANTZ, Primary Examiner

J. M. NELSON, Assistant Examiner

U.S. Cl. X.R.

260—677 XA, 660